June 26, 1928.

E. E. DEARTH

PNEUMATIC CORE

Filed Sept. 22, 1926

1,674,765

ELMER E. DEARTH
Inventor

By
Attorney

Patented June 26, 1928.

1,674,765

UNITED STATES PATENT OFFICE.

ELMER E. DEARTH, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

PNEUMATIC CORE.

Application filed September 22, 1926. Serial No. 137,005.

My invention relates to the art of building pneumatic tire casings and more particularly to an improvement in so called air bags or the pneumatic cores upon which it is customary to support cord casings during vulcanization. It is among the objects of my invention to provide an air bag structure particularly adapted for use in connection with casings built in the form of a substantially flat band which is later expanded to tire shape. It is a further object to provide an air bag structure which will be simple in form and economical to manufacture. Other and further objects will be apparent from the following specification and claims.

In the accompanying drawings which illustrate one embodiment of my invention.

Figure 1:
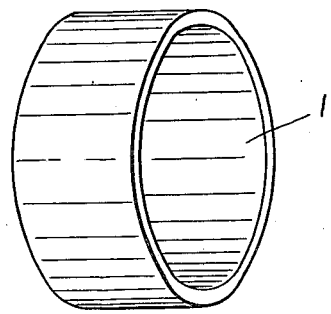
Figure 1 is a perspective view of the air bag of my invention.
Figure 2:
Figure 2 is a cross-sectional view of the air bag in relation to the tire casing, while the latter is in band form.
Figure 3:
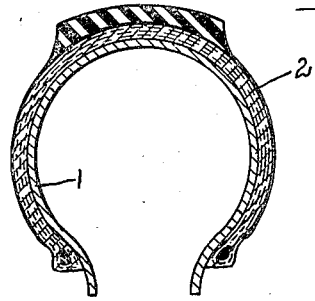
Figure 3 is a similar section showing the casing and air bag after forming to tire shape.
Figure 4:
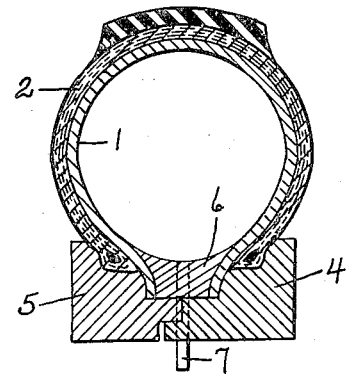
Figure 4 is a similar view showing one manner of securing the bead edges of the casing and bag preparatory to inflation during vulcanization.

Referring to the drawings 1 designates my improved air bag which is in the form of a cylindrical band of suitable width and of a diameter substantially equal to the interior diameter of the tire casing 2 when the latter is in band form. The bag 1 may be formed of any suitable stock such as the bag stocks now in use. The bag 1 in the form shown in Figure 1 is positioned upon the expander, used to shape the flat casings, and the casing is then positioned over it as shown in Figure 2. It will be understood that any conventional type of expander may be used. The flat casing with the air bag therein is then brought to shape, by the operation of the expander, as shown in Figure 3. The bead edges of the casing and of the air bag are then clamped in sealed relation by suitable bead rings conventionally indicated at 4 and 5 with a spacer ring 6 provided with an air valve 7 sealing the edges of the air bag. This assembly is then placed in a suitable mold and cured in any conventional manner.

Figure 5:
Figure 5 is a view similar to Figure 2 but showing a modified form of bag.
Figure 6:
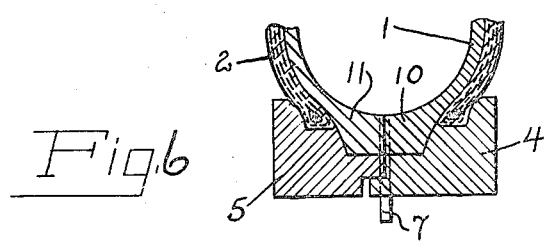
Figure 6 is a view similar to Figure 4, but showing the bag of Figure 5.

In Figures 5 and 6 I have shown a modified form of bag in which the edges are provided with thickened portions 10 and 11 which when the bag is in position as shown in Figure 6 form the closure for the bag, and the place of the separable ring 6. It will be understood that if desired the portions 10 and 11 may be reinforced as by the addition of fabric strips.

It will be seen that with my construction the air bag may be formed directly from a sheet of calendered stock, obviating the expensive operation of building the bag into tubular and annular form. Further the bag is inserted in the same operation which expands the tire to shape, thus doing away with the insertion of the bag as a separate operation.

I claim:

1. A pneumatic core for use in the vulcanization of tire casings comprising a substantially flat band of resilient material adapted to be expanded into a tire casing and means formed integral with the edges of the band to constitute the so expanded band into a substantially air tight annular chamber.

2. A pneumatic core for use in the vulcanization of tire casings comprising a substantially flat band of resilient material adapted to be expanded into a tire casing, the edges of the band being thickened to fill the space between the tire beads when the latter is positioned in a mold.

In testimony whereof I have signed my name to the above specification.

ELMER E. DEARTH.